United States Patent
Ohsawa et al.

(10) Patent No.: US 8,979,168 B2
(45) Date of Patent: Mar. 17, 2015

(54) UPRIGHT PILLAR SASH OF VEHICLE DOOR FRAME

(71) Applicant: Shiroki Corporation, Kanagawa (JP)

(72) Inventors: Shigenobu Ohsawa, Kanagawa (JP); Hiroaki Yamazaki, Kanagawa (JP)

(73) Assignee: Shiroki Corporation, Fujisawa-shi, Kanagawa (JP)

( * ) Notice: Subject to any disclaimer, the term of this patent is extended or adjusted under 35 U.S.C. 154(b) by 0 days.

(21) Appl. No.: 13/960,846

(22) Filed: Aug. 7, 2013

(65) Prior Publication Data
US 2014/0042772 A1 Feb. 13, 2014

(30) Foreign Application Priority Data
Aug. 9, 2012 (JP) ................... 2012-176591

(51) Int. Cl.
- *B62D 25/04* (2006.01)
- *B60J 5/04* (2006.01)
- *B60J 10/04* (2006.01)

(52) U.S. Cl.
CPC .............. *B60J 5/0402* (2013.01); *B60J 10/042* (2013.01)
USPC ..................................................... 296/146.5

(58) Field of Classification Search
USPC ..................................................... 296/146.5
See application file for complete search history.

(56) References Cited

FOREIGN PATENT DOCUMENTS

| JP | 2006082749 A | * | 3/2006 |
| JP | 2008302788 | | 12/2008 |

OTHER PUBLICATIONS

English Translation Abstract for JP2008302788 dated Dec. 18, 2008.

* cited by examiner

*Primary Examiner* — H Gutman
(74) *Attorney, Agent, or Firm* — Millen, White, Zelano & Branigan, P.C.

(57) ABSTRACT

An upright pillar sash of a vehicle door frame includes an outer member including a glass run fitting portion, and an inner member including an inner frame portion having a box-shaped cross section surrounding the glass run fitting portion. An outwardly extending portion, extending toward the edge portion of the glass run fitting portion toward the vehicle exterior, of the inner member and an overlapping edge, extending alongside the outwardly extending portion toward the vehicle exterior, of the outer member are spot welded with the overlapping edge superposing the outwardly extending portion. The outer member includes a side holding portion formed inside the glass run fitting portion to hold the glass run by contacting a side thereof, and a clearance recessed portion positioned between the side holding portion and the overlapping edge to allow a welding tool to enter.

5 Claims, 7 Drawing Sheets

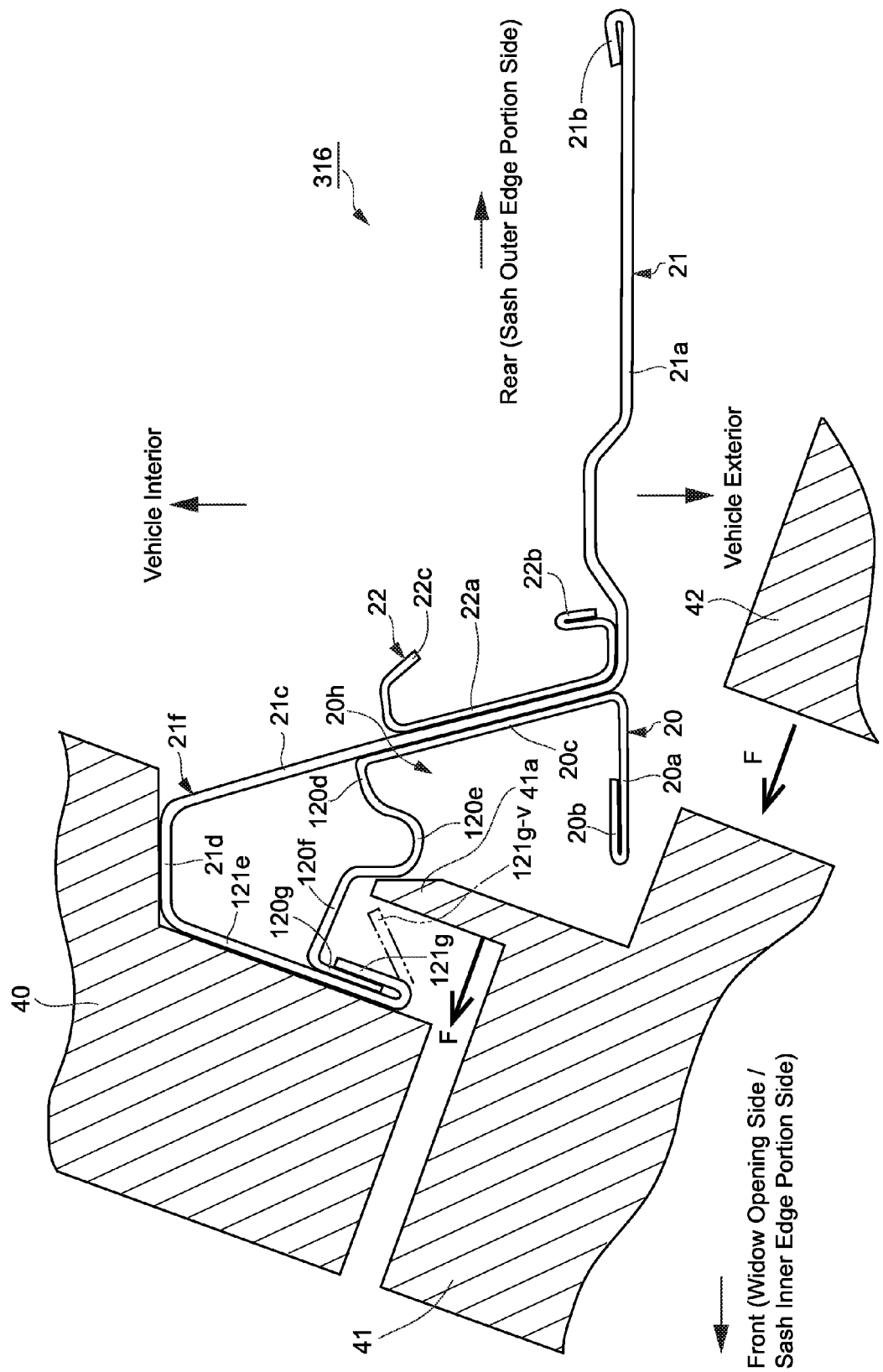

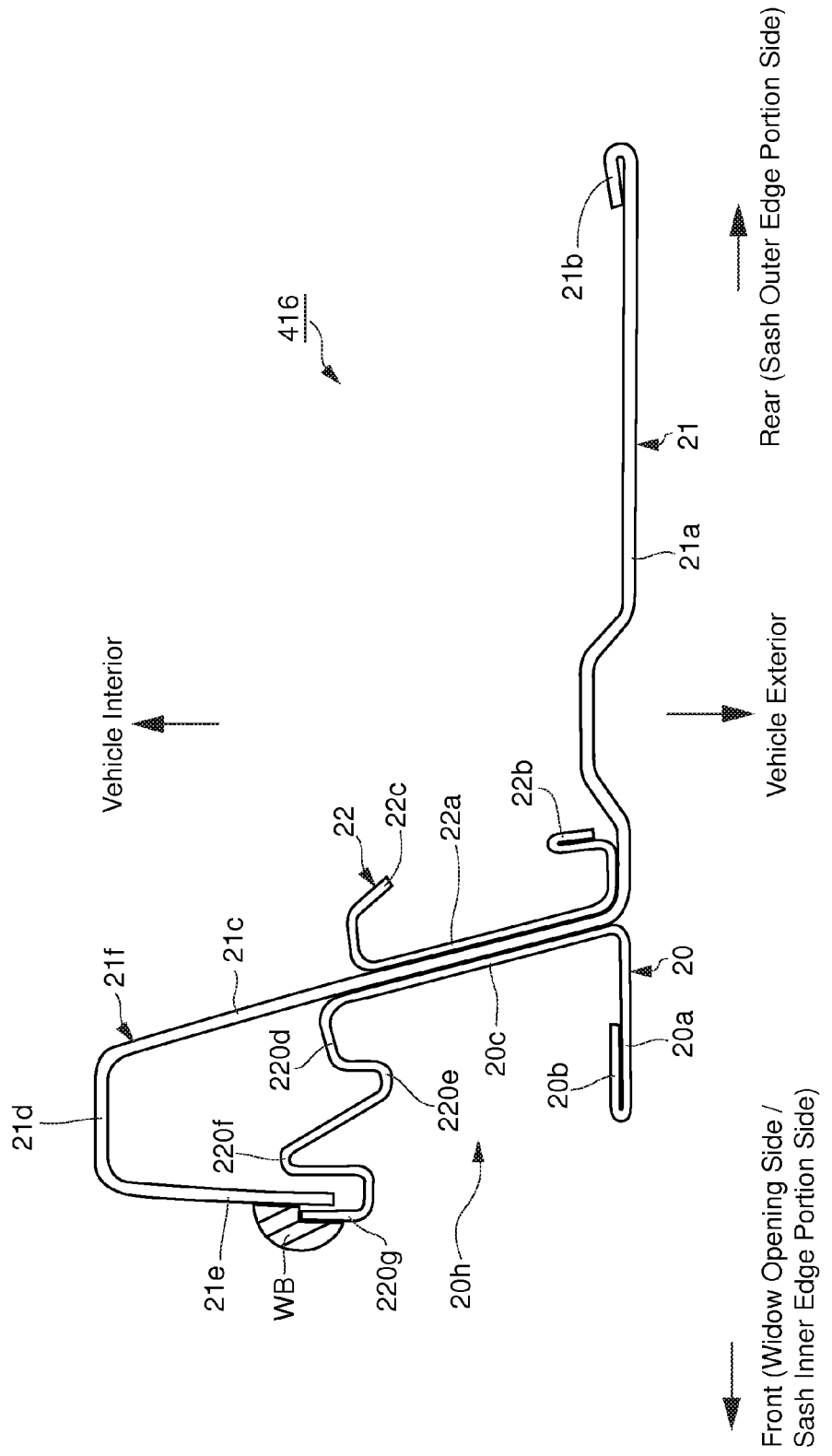

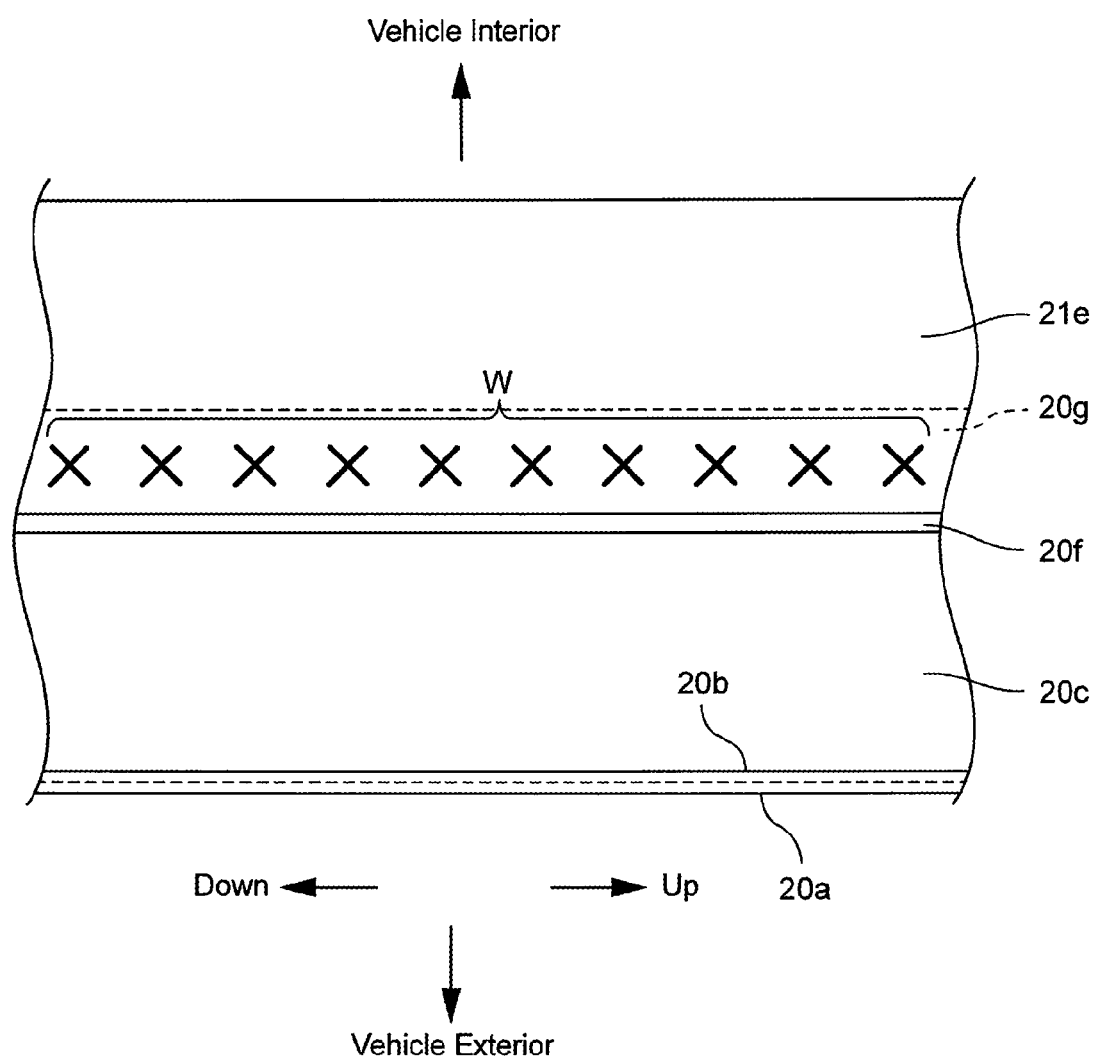

UPRIGHT PILLAR SASH OF VEHICLE DOOR FRAME

BACKGROUND OF THE INVENTION

1. Field of the Invention

The present invention relates to an upright pillar sash which constitutes a member of a door frame of a vehicle door.

2. Description of Related Art

It is known in the art for a sash portion of a door frame of a vehicle door, especially the upright pillar sash (side sash) that extends along a center pillar of a vehicle body, to have a structure in which a sash portion is made by joining an outer side (vehicle exterior side) molded part (i.e., an outer member) which is provided with a glass run fitting portion (glass run mounting portion) and an inner side (vehicle interior side) molded part (i.e., an inner member) which includes an inner frame portion that has a box-shaped cross section surrounding the glass run fitting portion to each other. In the case where the joint (joined portion) between the outer member and the inner member is positioned on the sash inner edge portion side that is exposed to the window opening of the door frame, there has been a demand to reduce the amount of projection of this joint into the window opening as much as possible to widen the view at the peripheral edge of the window opening. For instance, in the invention disclosed in Japanese Unexamined Patent Publication 2008-302788, in the type of upright pillar sash in which the outer member and the inner member are joined together by hemming, a structure reducing the amount of projection of the hemming joint into the window opening has been proposed.

Although the structure disclosed shown in the above-mentioned Japanese Unexamined Patent Publication 2008-302788 is effective in the case where the outer member and the inner member are joined together by hemming, it has been required in recent years to improve the degree of freedom in the shape of the periphery of the joint between the outer member and the inner member to provide a wider view at the peripheral edge of the window opening.

SUMMARY OF THE INVENTION

The present invention provides an upright pillar sash of a vehicle door frame, wherein the upright pillar sash has a high degree of freedom in shape and makes it possible to provide a wide view at the peripheral edge of the window opening.

According to an aspect of the present invention, an upright pillar sash of a vehicle door frame is provided, including an outer member which is positioned on a vehicle exterior side and includes a glass run fitting portion that retains a glass run therein; and an inner member which is positioned on a vehicle interior side and includes an inner frame portion having a box-shaped cross section surrounding the glass run fitting portion. An edge portion of the inner frame portion of the inner member and an edge portion of the glass run fitting portion of the outer member are joined together. The inner frame portion of the inner member includes an outwardly extending portion which extends toward the edge portion of the glass run fitting portion in a direction from the vehicle interior to the vehicle exterior. The edge portion of the glass run fitting portion of the outer member includes an overlapping edge which extends alongside the outwardly extending portion in the direction from the vehicle interior to the vehicle exterior. The outwardly extending portion of the inner member and the overlapping edge of the outer member are joined together by spot welding with the overlapping edge superposing the outwardly extending portion. The outer member includes a side holding portion which is formed inside the glass run fitting portion to hold the glass run by contacting a side of the glass run, and a clearance recessed portion which is positioned between the side holding portion and the overlapping edge to allow a welding tool to enter when the spot welding is performed.

It is desirable for the overlapping edge of the outer member to include a bent end portion which is positioned on an extension of the outwardly extending portion on the vehicle exterior side.

According to the upright pillar sash of a vehicle door frame that is devised according to the present invention, since the outwardly extending portion of the inner member, which extends in a direction from the vehicle interior to the vehicle exterior, and the overlapping edge of the outer member, which extends along the outwardly extending portion, are joined together by spot welding with the overlapping edge of the outer member lying on the outwardly extending portion of the inner member, a higher degree of freedom in the shape of the outwardly extending portion and the overlapping edge is achieved than the case where the outwardly extending portion of the inner member and the overlapping edge of the outer member are joined together by hemming, which makes it possible to form the joint between the outer member and the inner member into a shape such that the amount of projection of the joint into the window opening is reduced. This makes it possible to provide a wide view at the peripheral edge of the window opening with a simple structure, thereby improving the viewability through the window opening from the vehicle interior side.

The present disclosure relates to subject matter contained in Japanese Patent Application No.2012-176591 (filed on Aug. 9, 2012) which is expressly incorporated herein by reference in its entirety.

BRIEF DESCRIPTION OF THE DRAWINGS

The present invention will be discussed below in detail with reference to the accompanying drawings, in which:

FIG. 5 is a view showing a comparative example which is compared with each of the first through third embodiments of the upright pillar sash portions of the present invention; and FIG. 6 is a view similar to that of FIG. 2, showing another comparative example which is compared with each of the first through third embodiments of the upright pillar sash portions of the present invention.

FIG. 7 is a side elevation view showing a plurality of spot welded parts, as viewed from the arrow VII in FIG. 2.

DESCRIPTION OF THE EMBODIMENTS

Figure 1:
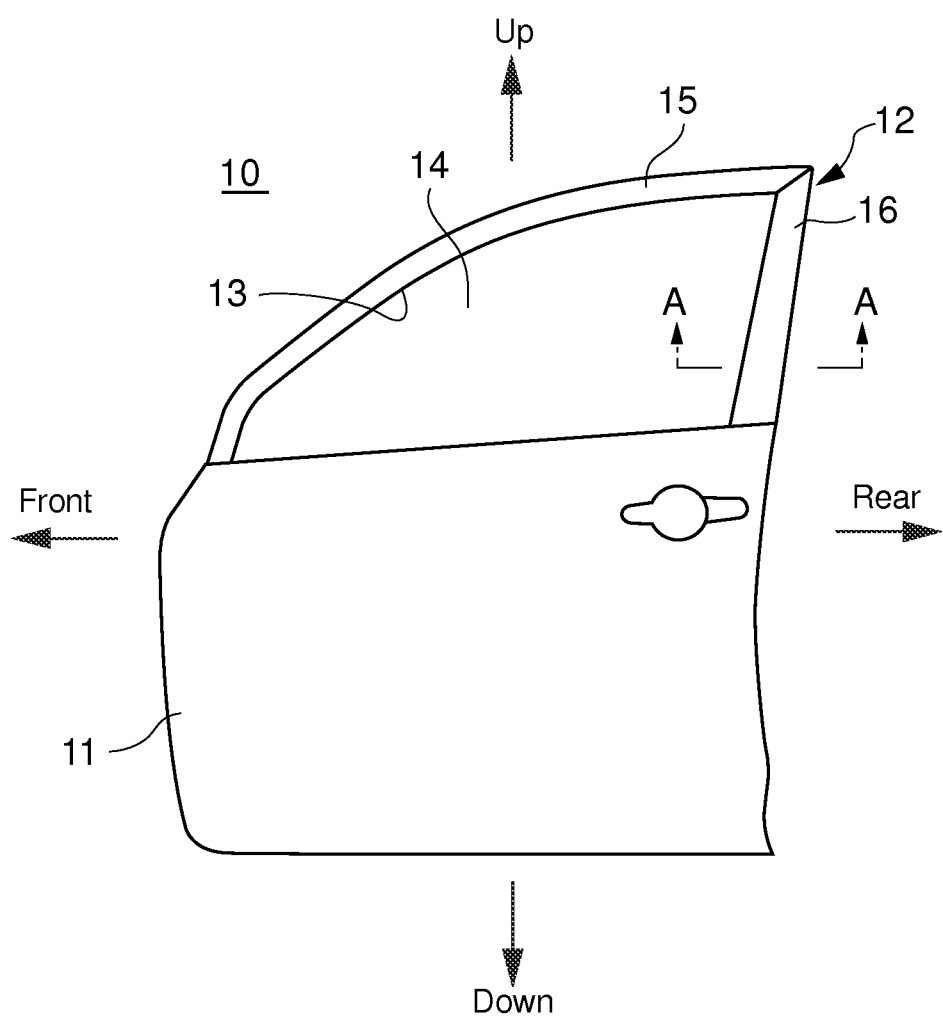
FIG. 1 is side elevational view of a vehicle door to which an upright pillar sash structure according to the present invention has been applied.

A motor-vehicle side door 10 shown in FIG. 1 is provided with a door panel 11 and a door frame 12 which is formed into a frame on top of the door panel 11. A window pane 14 (partly shown by a two-dot chain line in FIGS. 2 through 4) moves up and down in a window opening 13 which is surrounded by the upper edge of the door panel 11 and the inner edge of the door frame 12. The door frame 12 is provided with an upper sash portion 15 which forms the upper edge of the door 10 and an upright pillar sash portion (side sash portion/ side sash) 16 which is formed to extend substantially vertical from the rear of the door panel 11. When the door 10 is closed, the upper sash portion 15 is positioned along the associated lateral side edge of a roof panel (not shown) of a vehicle body (in other words, along the upper edge of the associated door opening of a vehicle body), while the upright pillar sash portion 16 is positioned along the adjacent center pillar (not shown) of the vehicle body.

The present embodiment of the door 10, to which an upright pillar sash structure according to the present invention has been applied, is a front door (specifically left front door), and directional expressions such as "the front", "the rear", "the vehicle interior side" and "the vehicle exterior side", mentioned in the following descriptions, designate directions determined with reference to the vehicle body to which the door 10 is fixed. In addition, the side (left-hand side with respect to FIG. 2) of the upright pillar sash portion 16 on which the window opening 13 is formed will be hereinafter referred to as the sash inner edge portion side, and the other side (right-hand side with respect to FIG. 2) of the upright pillar sash portion 16 that is exposed to the associated door opening of the vehicle body (i.e., to the adjacent center pillar (not shown) of the vehicle body) will be hereinafter referred to as the sash outer edge portion side. In a closed state of the door 10, the direction that the sash inner edge portion faces substantially corresponds to the direction toward the front of the vehicle, and the direction that the sash outer edge portion faces substantially corresponds to the direction toward the rear of the vehicle. Additionally, the direction which connects the vehicle interior side and the vehicle exterior side in a closed state of the door 10 will be hereinafter referred to as the direction of the thickness of the door 10.

Figure 2:
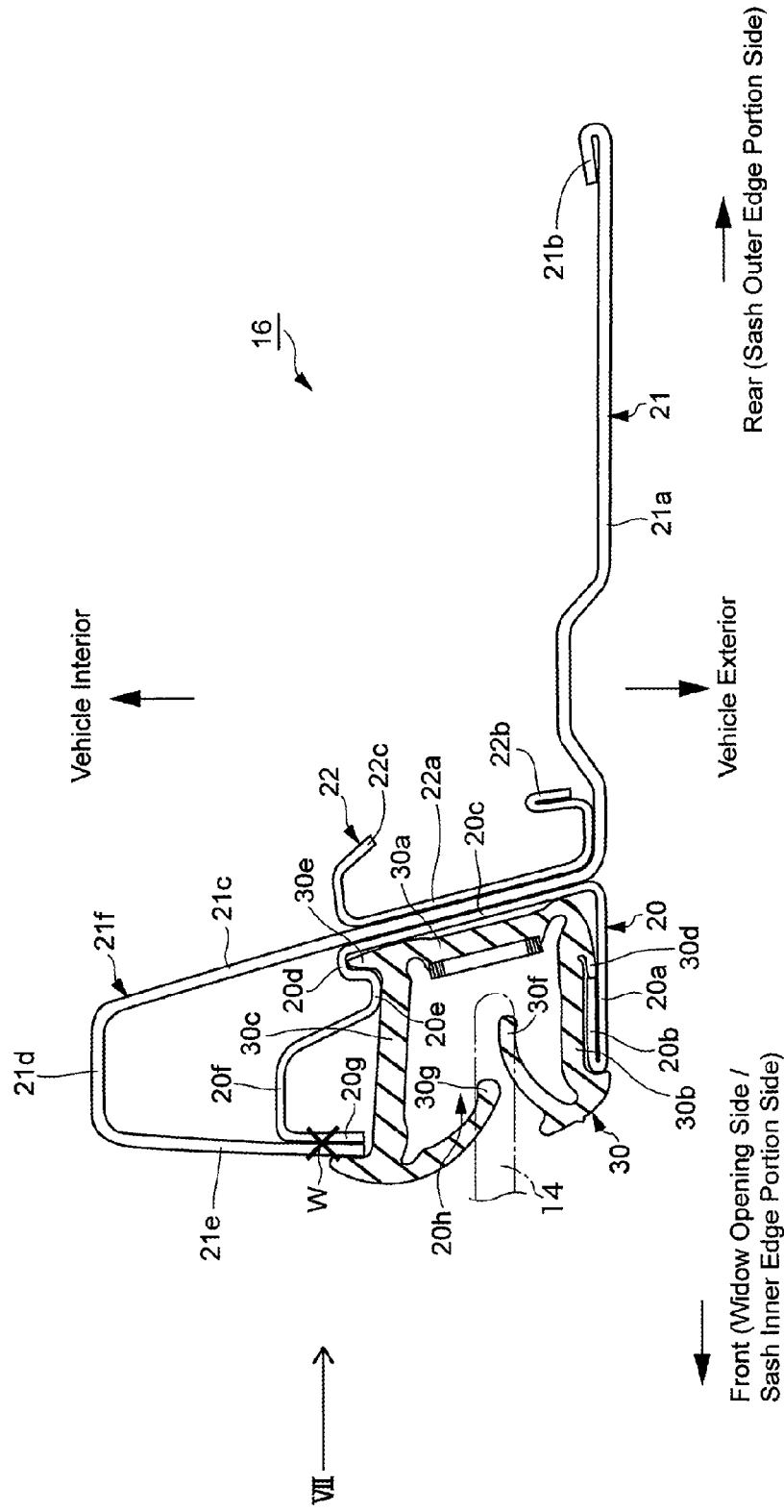
FIG. 2 is a cross sectional view taken along the line A-A shown in FIG. 1, showing a first embodiment of an upright pillar sash portion according to the present invention.

FIG. 2 shows a cross-section structure of a first embodiment of the upright pillar sash portion according to the present invention. The upright pillar sash portion 16 is configured from a combination of an outer member 20, an inner member 21 and a supplemental member 22.

The outer member 20 is provided with an exterior decorative portion 20a, a folded-back portion 20b, a base portion 20c, a vehicle-inner-side projecting portion 20d, a vehicle-outer-side projecting portion (side holding portion) 20e, a vehicle-inner-side projecting portion (clearance recessed portion) 20f and a frame overlapping edge 20g. The exterior design portion 20a faces toward the vehicle exterior, the folded-back portion 20b is formed by folding back the edge (left edge with respect to FIG. 2) of the exterior design portion 20a on the sash inner edge portion side inwardly toward the vehicle interior. The base portion 20c extends toward the vehicle interior from the sash outer edge portion of the exterior design portion 20a. The vehicle-inner-side projecting portion 20d is continuous with the base portion 20c and shaped into a protrusion which projects toward the vehicle interior. The vehicle-outer-side projecting portion 20e is continuous with the vehicle-inner-side projecting portion 20d and shaped into a protrusion which projects toward the vehicle exterior. The vehicle-inner-side projecting portion 20f is continuous with the vehicle-outer-side projecting portion 20e and shaped into a protrusion which projects toward the vehicle interior. The frame overlapping edge 20g is formed by bending the end of the vehicle-inner-side projecting portion 20f on the sash inner edge portion side outwardly toward the vehicle exterior. The outer member 20 is provided with a glass run fitting portion (glass run guide portion/glass run mounting portion) 20h which is composed of (defined by) the exterior design portion 20a, the folded-back portion 20b, the base portion 20c, the vehicle-inner-side projecting portion 20d, the vehicle-outer-side projecting portion 20e, the vehicle-inner-side projecting portion 20f and the frame overlapping edge 20g. The glass run fitting portion 20h is in the shape of a bottomed box which is open at the sash inner edge portion side (to the window opening 13 side).

The inner member 21 is provided with an exterior design portion 21a, a folded-back portion 21b, an inwardly extending portion 21c, a connecting portion 21d and an outwardly extending portion 21e, in that order from the sash outer edge portion side (the vehicle rear side). The exterior design portion 21a faces toward the vehicle exterior, similar to the exterior design portion 20a. The folded-back portion 21b is formed by folding back the edge (right edge with respect to FIG. 2) of the exterior design portion 21a on the sash outer edge portion side inwardly toward the vehicle interior. The inwardly extending portion 21c is formed to extend toward the vehicle interior alongside the base portion 20c of the outer member 20 by bending a portion of the exterior design portion 21a on the sash inner edge portion side. The connecting portion 21d is continuous with the inwardly extending portion 21c and extends along the vehicle forward/rearward direction. The outwardly extending portion 21e is formed by bending a portion of the connecting portion 21d on the sash inner edge portion side to extend toward the vehicle exterior. The inwardly extending portion 21c is an inclined portion which is inclined toward the sash inner edge portion side (i.e., forward) in the direction from the vehicle exterior to the vehicle interior. The outwardly extending portion 21e is very slightly inclined to the forward/rearward direction in the direction from the vehicle interior to the vehicle exterior (in the direction of the thickness of the door 10, which is substantially orthogonal to the exterior design portion 20a, with reference to the exterior design portion 20a), and a portion of the outwardly extending portion 21e with a predetermined width (length in the vertical direction with respect to FIG. 2) in the vicinity of the edge (lower edge with respect to FIG. 2) thereof is overlaid on the frame overlapping edge 20g of the outer member 20. The inwardly extending portion 21c is joined to a surface of the base portion 20c of the outer member 20 on the sash outer edge portion side, the outwardly extending portion 21e is joined to the surface of the frame overlapping edge 20g of the outer member 20 on the sash inner edge portion side, and the inwardly extending portion 21c, the connecting portion 21d and the outwardly extending portion 21e surround the glass run fitting portion 20h to form an inner frame portion 21f which projects toward the vehicle interior from the vehicle exterior side. The inner frame portion 21f has a box-shaped cross section, the width thereof progressively reducing in a direction from the vehicle exterior toward the vehicle interior in accordance with the inclination of the inwardly extending portion 21c.

The supplemental member 22 is provided with a base portion 22a and a pair of retaining portions 22b and 22c. The base portion 22a is joined to a surface of the inwardly extending portion 21c on the sash outer edge portion side, the retaining portion 22b is formed by bending an edge of the base portion 22a on the vehicle exterior side, and the retaining portion 22c is formed by bending an edge of the base portion 22a on the vehicle interior side. The base portion 22a, the retaining portions 22b and 22c of the supplemental member 22 and the external decorative portion 21a of the inner member 21 define a weather strip retaining recessed portion in which a weather strip (not shown) is fitted and held thereby. This weather strip includes a leg portion which is engaged in the pair of retaining portions 22b and 22c of the supplemental member 22 and an elastic contact portion which projects toward the sash outer edge portion from the aforementioned leg portion. The elastic contact portion of the weather strip comes into contact with the associated center pillar of the vehicle body and is elastically deformed to prevent water from entering inside of the vehicle when the door 10 is closed.

The outer member 20, the inner member 21 and the supplemental member 22 are initially formed as separate members and thereafter joined together. The outer member 20, the inner member 21 and the supplemental member 22 are fixed together by welding the base portion 20c, the inwardly extending portion 21c and the base portion 22a together with the base portion 20c, the inwardly extending portion 21c and the base portion 22a superposed onto each other.

In addition, the frame overlapping edge 20g of the outer member 20 and the outwardly extending portion 21e of the inner member 21 are fixed to each other. More specifically, the frame overlapping edge 20g and the outwardly extending portion 21e extend in the direction of the thickness of the vehicle door 10 (toward the vehicle exterior) as substantially parallel plates and are positioned relative to each other so that the outwardly extending portion 21e overlaps the surface of the frame overlapping edge 20g on the sash inner edge portion side as mentioned above; the edge portions of the outwardly extending portion 21e and the frame overlapping edge 20g which superpose each other are fixed to each other by spot welding.

This spot-welded part is shown by a mark "X" designated by a letter W in FIG. 2. This spot welding is carried out at a plurality of points in the lengthwise direction of the upright pillar sash 16, as shown in FIG. 7, (substantially in the vertical direction with respect to FIG. 1). When this spot welding is performed, a welding tool (not shown) is inserted into the glass run fitting portion 20h, and the vehicle-inner-side projecting portion 20f of the outer member 20 serves as a clearance recessed portion which allows this welding tool to enter.

As shown in FIG. 2, a glass run 30 is fitted in the glass run fitting portion 20h with the outer member 20, the inner member 21 and the supplemental member 22 joined together. The glass run 30 is provided with a base portion 30a, a pair of side portions 30b and 30c, a retaining projection 30d, a retaining projection 30e and a pair of elastic lips 30f and 30g. The base portion 30a abuts against the base portion 20c of the outer member 20. The position of the side portion 30b in the direction toward the vehicle exterior (the downward direction with respect to FIG. 2) is limited by the external decorative portion 20a of the outer member 20, and the position of the side portion 30c in the direction toward the vehicle interior (the upward direction with respect to FIG. 2) is limited by the vehicle-outer-side projecting portion (side holding portion) 20e of the outer member 20. The retaining projection 30d is engaged with the folded-back portion 20b of the outer member 20, and the retaining projection 30e is engaged with the vehicle-inner-side projecting portion 20d of the outer member 20. The pair of elastic lips 30f and 30g are formed to extend obliquely rearwards in directions approaching each other from the front ends of the pair of side portions 30b and 30c, respectively. The glass run 30 is prevented from coming off the glass run fitting portion 20h in the forward direction (leftward with respect to FIG. 2) by the engagement of the retaining projection 30d and the retaining projection 30e with the folded-back portion 20b and the vehicle-outer-side projecting portion 20e, respectively. The pair of elastic lips 30f and 30g come in contact with and are elastically deformed by the window pane 14 that enters the glass run fitting portion 20h to suppress vibrations of the window pane 14 and noise caused in association therewith. In FIG. 2, the pair of elastic lips 30f and 30g are in a free state before being elastically deformed by the window pane 14. The base end (front end of the side portion 30b) of the elastic lip 30f, which is positioned closer to the vehicle exterior side than the elastic lip 30g, is engaged with the folded portion of the outer member 20 between the exterior decorative portion 20a and the folded-back portion 20b, and this folded portion supports the elastic lip 30f so that the elastic lip 30f contacts the vehicle external side surface of the window pane 14 with a moderate pressure. In addition, the base end (front end of the side portion 30c) of the elastic lip 30g, which is positioned closer to the vehicle interior side than the elastic lip 30f, is engaged with the outwardly extending portion 21e of the inner member 21 in the vicinity of the edge (lower edge with respect to FIG. 2) of the outwardly extending portion 21e, and the engaging portion of the outwardly extending portion 21e supports the elastic lip 30g so that the elastic lip 30g contacts the vehicle internal side surface of the window pane 14 with a moderate pressure.

In the upright pillar sash portion 16 that has the above described structure, the glass run fitting portion 20h of the outer member 20 and the inner frame portion 21f of the inner member 21 are joined together by spot-welding the frame overlapping edge 20g and the outwardly extending portion 21e with the frame overlapping edge 20g and the outwardly extending portion 21e overlapping each other. According to this structure, the spot welding creates no portions that jut out forward on the sash inner edge portion side (the window opening 13 side). In addition, because of this spot-welding structure, constraints to the shapes of the outwardly extending portion 21e of the inner member 21 and the frame overlapping edge 20g of the outer member 20 (in the direction of extension thereof) are few, so that the shapes of the outwardly extending portion 21e and the frame overlapping edge 20g can each be set small with a small amount of projection forward on the sash inner edge portion side (the window opening 13 side). In the upright pillar sash portion 16, the part in the vicinity of the joint between the outwardly extending portion 21e and the frame overlapping edge 20g is the innermost part of the door frame 12, and accordingly, if the amount of projection of the outwardly extending portion 21e and the frame overlapping edge 20g into the window opening 13 is small, a wider practical opening space at the peripheral edge of the window opening can be provided by that much. In other words, a wide view at the peripheral edge of the window opening 13 can be provided, which improves the viewability through the window opening 13 from the vehicle interior side.

In addition, since a portion of the outwardly extending portion 21e, which is a large flat portion of the inner member 21, is simply overlaid on and spot-welded to the frame overlapping edge 20g of the outer member 20, the strength of this joint between the inner member 21 and the outer member 20 can be easily ensured even though the structure of this joint is simple. Additionally, since the joint surface (joint area) between the outwardly extending portion 21e and the frame overlapping edge 20g is not exposed at the window opening 13 side, the glass run 30 does not have to be extended by a large amount toward the vehicle interior to improve the appearance of the joint, which makes miniaturization of the glass run 30 possible. As shown in FIG. 2, a portion of the glass run 30 in the vicinity of the front end of the side portion 30c is engaged with the edge (lower edge with respect to FIG. 2) of the outwardly extending portion 21e; however, the glass run 30 has a small shape that does not cover the remaining portion of the outwardly extending portion 21e that is positioned on the vehicle interior side from the aforementioned edge thereof.

Figure 3:
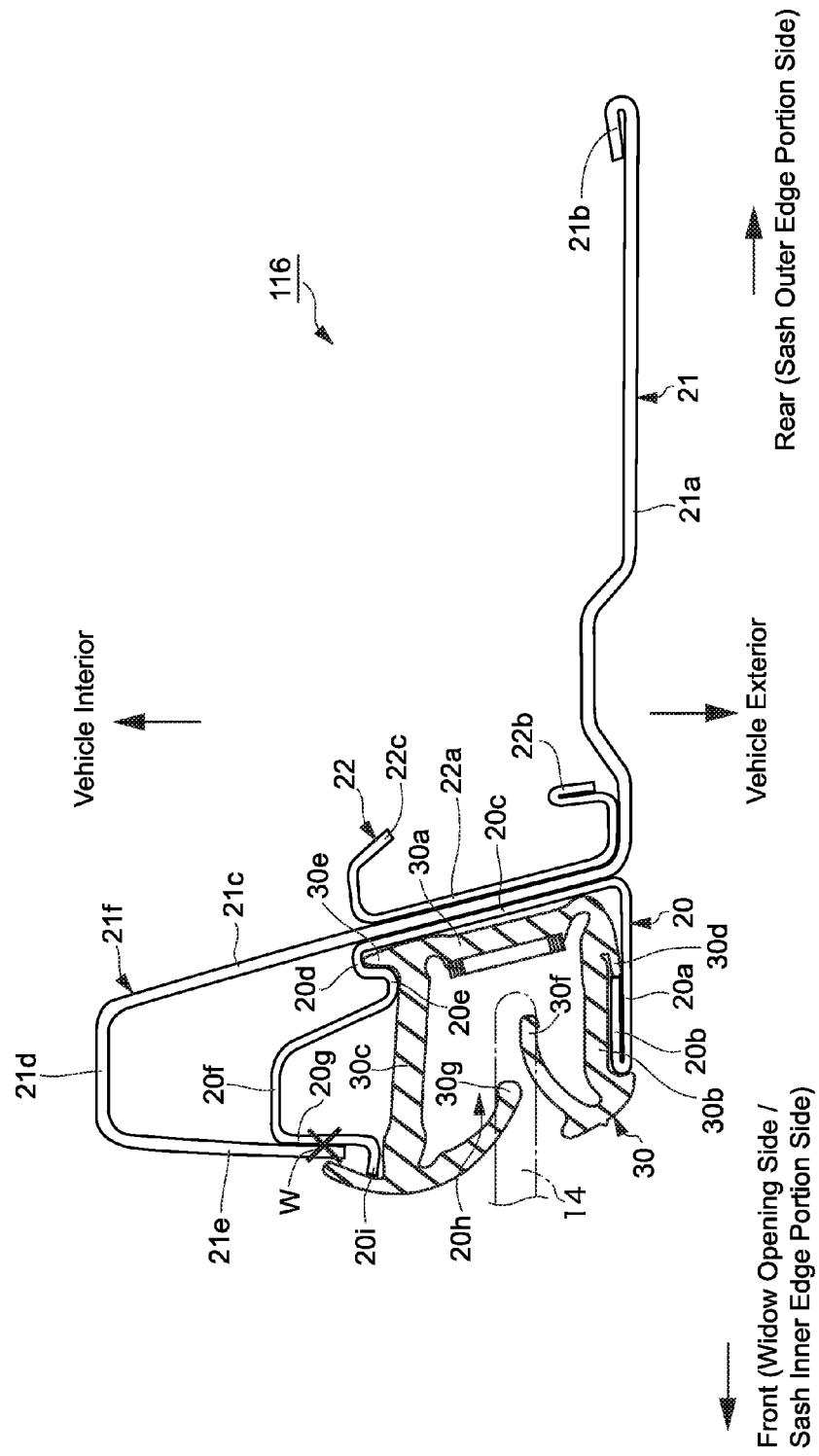
FIG. 3 is a view similar to that of FIG. 2, showing a second embodiment of the upright pillar sash portion according to the present invention.

FIG. 3 shows a second embodiment of the upright pillar sash portion according to the present invention. In the upright pillar sash portion 116 shown in FIG. 3, in addition to the structure of the outer member 20 in the first embodiment of the upright pillar sash portion 16, the outer member 20 is further provided, at the edge of the frame overlapping edge 20g on the vehicle exterior side, with a protective bent portion (bent end portion) 20i which is formed by bending the edge of the frame overlapping edge 20g on the vehicle exterior side in the forward direction. The protective bent portion 20i lies on an extension of the outwardly extending portion 21e of the inner member 21 on the vehicle exterior side to extend alongside the side portion 30c of the glass run 30. The engagement of the protective bent portion 20i with the side portion 30c of the glass run 30 eliminates the possibility of the glass run 30 being damaged by an end (edge) of the outwardly extending portion 21e or the protective bent portion 20i, thus improving the protective performance for the glass run 30. The length of the protective bent portion 20i in the forward direction is set so that the protective bent portion 20i substantially fits within the range of the above-mentioned extension of the outwardly extending portion 21e in the forward/rearward direction, and therefore, a wide view at the peripheral edge of the window opening 13 that is comparable with that in the first embodiment of the upright pillar sash portion can be secured.

Figure 4:
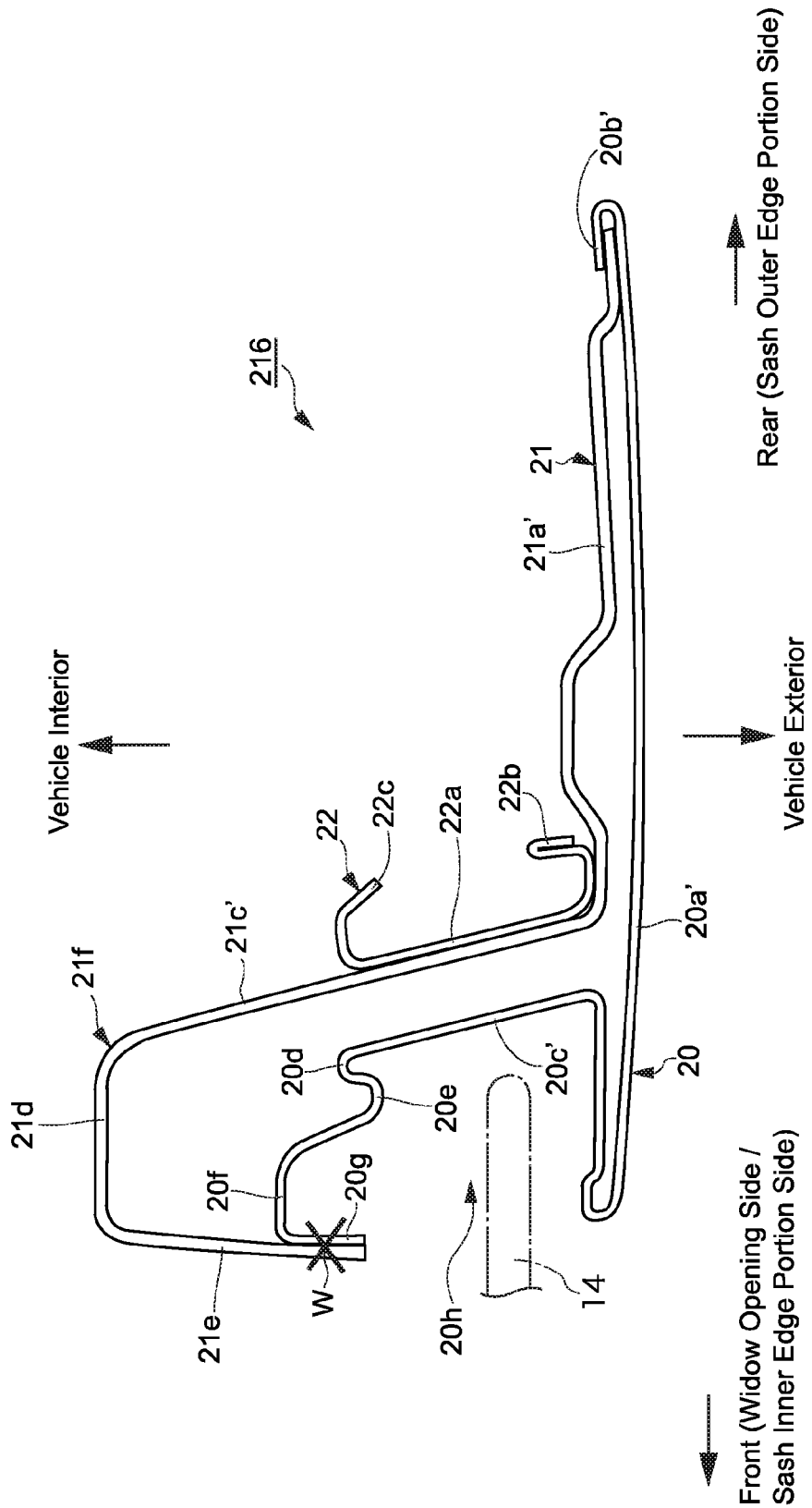
FIG. 4 is a view similar to that of FIG. 2, showing a third embodiment of the upright pillar sash portion according to the present invention.

FIG. 4 shows a third embodiment of the upright pillar sash portion according to the present invention. In the upright pillar sash portion 216 shown in FIG. 4, the outer member 20 and the inner member 21 are partly different in cross sectional shape from those of the first embodiment of the upright pillar sash portion 16 (shown in FIG. 2); however, elements of the upright pillar sash portion 216 which correspond to those of the first embodiment of the upright pillar sash portion 16 are designated by the same reference numerals even if slightly different in shape, and the description of such elements will be omitted herein. In addition, although not shown in FIG. 4, a glass run is fitted and held in the glass run fitting portion 20h, as in the previous embodiments of the upright pillar sash portions. In the upright pillar sash portion 216 shown in FIG. 4, the outer member 20 is provided with an external decorative portion 20a' which extends by a large amount from the sash inner edge portion side to the sash outer edge portion side to cover an exterior side portion 21a' (which corresponds to the exterior design portion 21a shown in FIG. 2) of the inner member 21 from the vehicle exterior side. Accordingly, the entire part of the external decorative portion of the upright pillar sash portion 16 is formed by the outer member 20. A folded-back portion 20b' which is formed at the edge (right edge with respect to FIG. 4) of the exterior design portion 20a' on the sash outer edge portion side fixedly pinches (clamps) the end (right edge with respect to FIG. 4) of the exterior side portion 21a' on the sash outer edge portion side (i.e., this end of the exterior side portion 21a' and the folded-back portion 20b' are joined together by hemming). In addition, a base portion 20c' of the inner member 20 (which corresponds to the base portion 20c shown in FIG. 2) is spaced from an inwardly extending portion 21c' of the outer member 21 (which corresponds to the inwardly extending portion 21c shown in FIG. 2), i.e., the base portion 20c' does not lie on the inwardly extending portion 21c'. The joining structure by spot welding between the frame overlapping edge 20g and the outwardly extending portion 21e in the third embodiment of the upright pillar sash portion is similar to that of the first embodiment of the upright pillar sash portion.

FIGS. 5 and 6 show comparative examples of upright pillar sash portions which are compared with the above described first through third embodiments of the upright pillar sash portions. In these comparative examples, elements similar to those of the above described first through third embodiments of the upright pillar sash portions are designated by the same reference numerals.

FIG. 5 shows a type of upright pillar sash portion 316 in which an outwardly extending portion 121e (which corresponds to the outwardly extending portion 21e shown in FIG. 2) of the inner member 21 and a frame overlapping edge 120g (which corresponds to the frame overlapping edge 20g shown in FIG. 2) of the outer member 20 are joined together by hemming; this joining structure is identical to that disclosed in Japanese Unexamined Patent Publication 2008-302788. The outwardly extending portion 121e is shaped to be inclined toward the sash inner edge portion side (i.e., forward) in the direction from the vehicle interior to the vehicle exterior. In a state before the outer member 20 and the inner member 21 are joined together, the inner member 21 is provided at the edge of the outwardly extending portion 121e on the vehicle exterior side with a temporary bent portion 121g-v (shown by two-dot chain line in FIG. 5) which is formed by being gently angled toward the sash outer edge portion side. The outer member 20 is provided with a vehicle-inner-side projecting portion 120d, a vehicle-outer-side projecting portion 120e and a vehicle-inner-side projecting portion 120f that are continuously formed as a wall of the glass run fitting portion 20h of the outer member 20 on the vehicle interior side. The outer member 20 is further provided with a frame overlapping edge 120g which is formed continuously with the vehicle-inner-side projecting portion 120f to extend obliquely toward the vehicle exterior alongside the outwardly extending portion 121e.

As shown in FIG. 5, the outer member 20 and the inner member 21 in a temporarily combined state are set on a fixed jig 40. The fixed jig 40 is provided with a support surface which is shaped to correspond to the shapes of the outer surfaces of the connecting portion 21d and the outwardly extending portion 121e of inner member 21. The fixed jig 40 supports the outer member 20 and the inner member 21 so that the outwardly extending portion 121e lies horizontally. Subsequently, a movable die 41 having a press projection 41a is set so that the press projection 41a faces the temporary bent portion 121g-v. The movable die 41 is movable in the direction shown by arrows F in FIG. 5, and the vehicle-inner-side projecting portion 120f of the outer member 20 serves as a recessed portion which is recessed to be prevented from interfering with the press projection 41a. After completion of the setting of the movable die 41, a press body 42 is moved in the direction of the arrows F to come into abutting contact with the movable die 41. Thereupon, the moving force of the press body 42 causes the movable die 41 to move in the direction of the arrows F, which causes the press projection 41a to press the temporary bent portion 121g-v so as to bring the temporary bent portion 121g-v into intimate contact with the back of the frame overlapping edge 120g so that the temporary bent portion 121g-v forms into a folded-back portion 121g. The folded-back portion 121g and the outwardly extending portion 121e constitute a hemming joint which sandwiches and fixes the frame overlapping edge 120g between the folded-back portion 121g and the outwardly extending portion 121e.

In the comparative example shown in FIG. 5, the internal space of the vehicle-inner-side projecting portion 120f of the outer member 20 has been enlarged to secure a space in which the press projection 41a of the movable die 41 moves when the hemming process is performed, and the outwardly extending portion 121e of the inner member 21 is accordingly formed to project obliquely toward the sash inner edge portion side. Conversely, in each of the above described first through third embodiments of the upright pillar sash portions, a space does not need to be provided for movable die (the press projection 41a) for carrying out a hemming process in the vicinity of the vehicle-inner-side projecting portion 20f of the glass run fitting portion 20h since the frame overlapping edge 20g and the outwardly extending portion 21e are joined together by spot welding. Although a welding tool enters the glass run fitting portion 20h when spot welding is performed, the space required for the insertion of the welding tool is smaller than the space in which the movable die (the press projection 41a) for hemming process moves, and accordingly, the degree of freedom in shape setting of the outwardly extending portion 21e is high. As can be understood from the comparison between the upright pillar sash portions shown in FIGS. 2 through 4 and the upright pillar sash portion shown in FIG. 5, the outwardly extending portion 21e in each of the above described first through third embodiments of the upright pillar sash portions shown in FIGS. 2 through 4 is smaller in the amount of projection toward the sash inner edge portion side than the outwardly extending portion 121e in the comparative example shown in FIG. 5, so that the effect of widening the view at the peripheral edge of the window opening 13 is obtained.

The comparative example shown in FIG. 6 is a type of upright pillar sash portion 416 in which the outer member 20 and the inner member 21 are joined together by arc welding. The inner member 21 in this comparative example is similar to that in the first embodiment of the upright pillar sash portion that is shown in FIG. 2. The outer member 20 of the upright pillar sash portion 416 is provided with a vehicle-inner-side projecting portion 220d, a vehicle-outer-side projecting portion 220e, and a vehicle-inner-side projecting portion 220f that are continuously formed as a wall of the glass run fitting portion 20h of the outer member 20, and the outer member 20 of the upright pillar sash portion 416 is further provided with a frame joining portion 220g. The frame joining portion 220g is formed continuously with the vehicle-inner-side projecting portion 220f. The frame joining portion 220g is shaped to have a U-shaped cross section as shown in FIG. 6; more specifically, the frame joining portion 220g firstly projects toward the vehicle exterior from the vehicle-inner-side projecting portion 220f, subsequently bends toward the sash inner edge portion side, and thereafter bends toward the vehicle interior over the edge of the outwardly extending portion 21e on the vehicle exterior side to extend toward the vehicle interior alongside a surface of the outwardly extending portion 21e on the sash inner edge portion side. The portions of the frame joining portion 220g and the outwardly extending portion 21e which are overlaid onto each other are fixed to each other by arc welding from the sash inner edge portion side to form a welded bead WB. In this comparative example, since the frame joining portion 220g envelops the vehicle exterior side edge (the lower edge with respect to FIG. 6) of the outwardly extending portion 21e to be positioned closer to the sash inner edge portion side than the outwardly extending portion 21e and also since the welded bead WB protrudes forward toward the sash inner edge portion side, the amount of projection of the joint between the outer member 20 and the inner member 21 on the window opening 13 side is greater than that of the joining structure of each of the above described first through third embodiments shown in FIGS. 2 through 4.

Although the present invention has been described based on the above illustrated embodiments, the present invention is not limited solely to these particular embodiments; various modifications to the above illustrated embodiments is possible without departing the spirit and scope of the present invention. For instance, the present invention is characterized in the joint between the outer member and the inner member on the glass run fitting portion side in the upright pillar sash portion of a door frame, and accordingly, the weather strip retaining portion can be modified to have a different structure from that in each of the above described embodiments of the upright pillar sash portions.

Although the present invention has been applied to the upright pillar sash of a front door of a vehicle in each of the above illustrated embodiments, the present invention can also be applied to the upright pillar sash of a rear door of a vehicle.

Obvious changes may be made in the specific embodiments of the present invention described herein, such modifications being within the spirit and scope of the invention claimed. It is indicated that all matter contained herein is illustrative and does not limit the scope of the present invention.

The entire disclosures of all applications, patents and publications, cited herein and of corresponding Japanese Patent Application No. 2012-176591, filed Aug. 9, 2012 are incorporated by reference herein.

The invention claimed is:

1. An upright pillar sash of a vehicle door frame, comprising:
  an outer member which is positioned on a vehicle exterior side and includes a glass run fitting portion that retains a glass run therein; and
  an inner member which is positioned on a vehicle interior side and includes an inner frame portion having a box-shaped cross section surrounding said glass run fitting portion,
  wherein an edge portion of said inner frame portion of said inner member and an edge portion of said glass run fitting portion of said outer member are joined together,
  wherein said inner frame portion of said inner member includes an outwardly extending portion which extends toward said edge portion of said glass run fitting portion in a direction from said vehicle interior to said vehicle exterior,
  wherein said edge portion of said glass run fitting portion of said outer member includes an overlapping edge which extends alongside said outwardly extending portion in said direction from said vehicle interior to said vehicle exterior,
  wherein said outwardly extending portion of said inner member and said overlapping edge of said outer member are joined together by spot welding with said overlapping edge superposing said outwardly extending portion,
  wherein said overlapping edge is contacted, on one side thereof only by said outwardly extending portion of said inner member and wherein said outwardly extending portion of said inner member and said overlapping edge of said outer member are joined together by spot welding so that said outwardly extending portion terminates at the vehicle exterior side thereof, and
  wherein said outer member includes a side holding portion which is formed inside said glass run fitting portion to hold said glass run by contacting a side of said glass run, and a clearance recessed portion which is positioned between said side holding portion and said overlapping edge to allow a welding tool to enter when said spot welding is performed.

2. The upright pillar sash according to claim 1, wherein said overlapping edge of said outer member comprises a bent end portion which is positioned on an extension of said outwardly extending portion on said vehicle exterior side.

3. The upright pillar sash according to claim 1, wherein said outwardly extending portion extends in a thickness direction, from said vehicle interior to said vehicle exterior, of the door.

4. The upright pillar sash according to claim 3, wherein a vehicle-interior-side surface of said clearance recessed portion extends in a direction substantially orthogonal to said thickness direction of the door.

5. The upright pillar sash according to claim 1, wherein a plurality of spot-welded parts are arranged in a lengthwise direction of said outwardly extending portion of said inner member and said overlapping edge of said outer member.

* * * * *